United States Patent
Melfi (10) Patent No.: US 7,511,438 B2
(45) Date of Patent: Mar. 31, 2009

(54) ELECTRIC BRAKING OF MACHINERY WITH A PLURALITY OF INVERTER-FED MOTORS

(75) Inventor: Michael J. Melfi, Euclid, OH (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 82 days.

(21) Appl. No.: 11/540,358

(22) Filed: Sep. 29, 2006

(65) Prior Publication Data
US 2008/0079373 A1    Apr. 3, 2008

(51) Int. Cl.
*H02P 5/00* (2006.01)
(52) U.S. Cl. ............... 318/87; 318/63; 318/139; 318/703; 318/757; 180/65.1
(58) Field of Classification Search ............ 318/63, 318/757, 375, 376, 87, 703, 139; 180/65.1
See application file for complete search history.

(56) References Cited

U.S. PATENT DOCUMENTS

| | | | |
|---|---|---|---|
| 6,227,961 B1 * | 5/2001 | Moore et al. ............... 454/229 |
| 6,554,088 B2 * | 4/2003 | Severinsky et al. ......... 180/65.2 |
| 7,104,347 B2 * | 9/2006 | Severinsky et al. ......... 180/65.2 |
| 7,185,591 B2 * | 3/2007 | Kumar et al. ................. 105/35 |
| 7,408,319 B2 * | 8/2008 | Lloyd et al. ................. 318/729 |
| 2006/0046895 A1 * | 3/2006 | Thacher et al. ................. 477/4 |
| 2007/0164693 A1 * | 7/2007 | King et al. .................. 318/109 |

* cited by examiner

*Primary Examiner*—Bentsu Ro
*Assistant Examiner*—Antony M Paul
(74) *Attorney, Agent, or Firm*—Thompson Coburn LLP (57) ABSTRACT

A system and method are provided whereby at least two motors driven by an inverter coupled to a DC bus are configured to alternate between regenerative and injection braking such that at least one motor is placed in regenerative braking mode and at least one motor is placed in motoring mode. Energy is simultaneously placed on and removed from the DC bus in a manner allowing a large current to flow in as many motors as possible, for fast stoppage of load inertia. At least one motor may be placed in regenerative braking mode and at least one motor in DC injection mode, such that energy is simultaneously placed onto and removed from the DC bus, respectively. Further, a single motor may be is alternated between regenerative braking and DC injection braking, such that energy is alternately placed onto and removed from the DC bus, respectively.

19 Claims, 7 Drawing Sheets

ELECTRIC BRAKING OF MACHINERY WITH A PLURALITY OF INVERTER-FED MOTORS

BACKGROUND

The invention relates generally to the control of electric motors. Particularly, this invention relates to electric motor braking using regenerative braking or direct current (DC) injection braking or a combination thereof.

Electric motors, as used in many applications, typically require braking during their operation. For example, electric motors may be used in certain propulsion systems as prime movers, such as for vehicle drives. Further, during the course of motion of a vehicle or other inertial load it may be desirable to slow the load or bring it to a complete halt. More generally, braking systems and methods are an integral part of any system utilizing electric motors whose speeds may vary according to certain operational requirements. Many motors, particularly those driven at variable speeds, are driven by inverters, and braking may provide energy to a DC bus that provides power to the inverters.

Methods of motor braking may utilize the motor itself or, alternately, utilize a system of motors as part of a braking mechanism. Accordingly, motor braking techniques may include regenerative braking, whereby a motor generates a braking torque under its inertial loading. For example, in case of induction motors, a motor is supplied with current at a frequency that is less than a rotational frequency, i.e., speed of the motor, resulting in regenerative braking and in energy supplied to a DC bus coupled to the inverter feeding the motor. In another approach, energy provided by such inertial loading can be dissipated by resistive elements connected to the dc bus, disposed in the motor, or can be used for motoring another motor, if available. However, there are systems where this may not be possible and, consequently, the inertial loading of the motor may saturate the DC bus of a driving inverter with a high voltage, causing the DC bus to trip. Under such circumstances, the motor ceases to supply a braking torque to the system to which the motor is coupled, consequently, curtailing system stoppage.

There is a need in the art for improved techniques for braking inertial loads. In particular, there is a need for an approach to braking such loads that provides for using motors for braking purposes, while avoiding overloading an inverter DC bus in a way that causes overvoltage conditions on the bus.

BRIEF DESCRIPTION

A system and method are provided whereby at least two motors driven by an inverter coupled to a DC bus are configured to alternate between regenerative and injection braking such that at least one motor is placed in regenerative braking mode and at least one motor is placed in motoring mode. In such a configuration, energy is simultaneously placed on and removed from the DC bus in a manner allowing a large current to flow in as many motors as possible. Consequently, this enables dissipating a greatest amount of energy in a shortest time period, resulting in fast stoppage of load inertia. Further, a system and method are provided for placing at least one motor in regenerative braking mode and at least one motor in DC injection mode, such that energy is simultaneously placed onto and removed from the DC bus, respectively. Further, a system and method are provided such that a single motor is alternated between regenerative braking and DC injection braking, such that energy is alternately placed onto and removed from the DC bus, respectively.

In all of these scenarios, a motor or motors may provide energy to and/or draw energy from a DC bus used to supply power to an inverter that drives the motor or motors. The regulation of the regenerative and injection braking regimes may permit effective braking of the inertial load, while avoiding overvoltage conditions on the DC bus.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
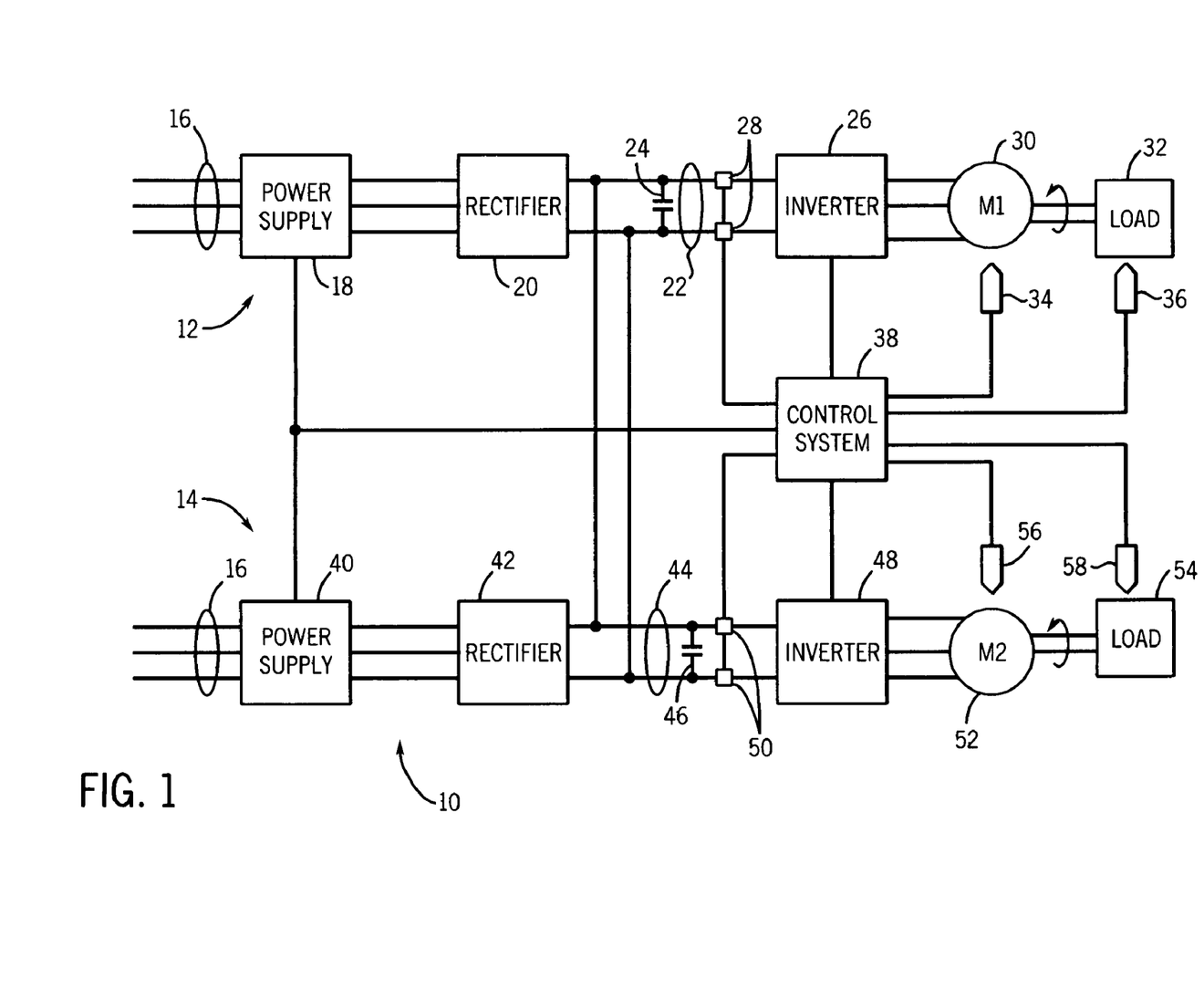
FIG. 1 is a diagrammatical representation of a two motor system coupled via their DC busses and configured to brake electric motors in accordance with an embodiment of the present technique.

Referring now to the drawings, and particularly to FIG. 1, an inertial load drive system 10 is illustrated as including two motor drive systems 12 and 14 coupled via a common DC bus. The common DC bus connects motor system 12 and motor drive system 14 so as to facilitate DC power flow between systems 12 and 14. Motor drive systems 12 and 14 are coupled to inertial loads, such as vehicle tracks, wheels or axles, winches, cranes, manufacturing tools (e.g., pulleys or driven rolls) and so forth. Further, such systems may be driven by two motors or more such that each motor may drive a load disposed on a particular location (e.g., side) of the driven system. For example motors systems 12 and 14 may be used to motor a mining vehicle such that motor drive systems 12 may drive motor tracks disposed on one side of the vehicle, while motor drive system 14 drives tracks disposed on a second or opposite side of the vehicle. As further described below, during vehicle braking, energy transfer between the motor drive systems 12 and 14 may be performed in a manner enabling alternating between various braking modes or between periods in which a dynamic braking regime is applied and periods when no dynamic braking is performed. In this manner, each motor coupled to the vehicle or other inertial load may experience a proper amount of braking resulting in desired vehicle motion. It should be borne in mind that aside from energy dissipated in the motors resulting directly from one of the above mentioned braking regimes, energy dissipation may also originate in other mechanical components and/or processes to which the motors are coupled. In example of the above mentioned mining vehicle, energy dissipation can also be a result of vehicle crabbing and/or skidding of the tracks of the vehicle during its braking.

Accordingly, the motor drive system 12 is provided with a three-phase alternating current AC input power 16, typically from a power grid, via a three-phase power supply 18. Alternatively, the motor drive system 12 may be provided with a single phase power. In other embodiments, the motor drive system 12 may be provided with a power input originating from electrical sources, which may include a DC generator, a battery or a fuel cell. In such embodiments, there would be no need for the motor drive system 12 to include a rectifier, such as rectifier 20 shown in FIG. 1. The power supply 18 routes the AC supply to a rectifier 20 which converts the AC input into power and applies the DC power to a DC bus. The system 12 further includes a DC bus 22 with a capacitor 24 placed across the DC bus to smooth the voltage provided by the rectifier 20. Other components may also be coupled to the DC bus, such as snubbers, and so forth, as will be readily appreciated by those skilled in the art. The rectifier 20 provides DC input power to an inverter 26. One or more sensors are also coupled to the bus, including voltage sensors 28. The inverter 26 provides output power to motor 30, coupled to an inertial load 32. As will be appreciated by those skilled in the art, the inverter 26 is typically controlled by a control circuit that triggers solid state switches in the inverter 26 (e.g., IGBT's) to generate an AC output waveform of desired frequency for motoring the motor. Accordingly, the sensors 28 are configured for detecting DC bus voltage as power is drawn from the DC bus by the inverter, or as power is applied to the bus during braking, as described below.

The motor system may also include additional sensors 34 and 36 coupled to the motor 30 and load 32, respectively. Sensor 34 may be configured to monitor motor parameters, such as motor speed, shaft angle and so forth. Sensor 36 is configured to monitor parameters, such as directional shifts or accelerations of the load. These parameters are provided to a controller 38 which is also coupled to power supply 18, the DC bus voltage sensors 28 and inverter 26. In some embodiments, controller 38 may be powered by a DC bus, such as DC busses 22 or 44. In operation, controller 38 may coordinate motoring and braking of the motor via control of the inverter 26, as well as disconnecting power supplies 18 and 40 before motor braking initiates, as described below.

Motor drive system 14 includes components similar to those described above with reference to the motor drive system 12. System 14 includes a three-phase AC supply 40, applying power to a rectifier 42, which is further connected to a DC bus 44. Placed across DC bus 44 is a capacitor 46 configured to smooth out voltage provided by rectifier 42 to an inverter 48. Also coupled to the DC bus 44 of the motor drive system 14 are sensors 50 configured to sense voltage across DC bus 44.

The rectifier 42 of system 14 provides DC input power to inverter 48 which provides AC power to motor 52 coupled to inertial load 54. Motor 52 and load 54 may each be instrumented with various sensors, as represented by sensors 56 and 58, configured to monitor motor and load parameters, respectively, such as those mentioned above with respect to motor 30. Further, sensors 56 and 58 are connected to controller 38. Controller 38 is also coupled to power supply 40, inverter 48 and sensors 50, for coordinating operation of motor 52 as described below.

DC busses for both drives are coupled to one another to create a common DC bus. The common DC bus connection facilitates transfer of energy from one motor system to another as motors 30 and 52 undergo braking to, for example, slow a system to which the motors may be coupled. As noted above, such a system may include vehicle tracks, wheels or axles, winches, cranes, manufacturing tools (e.g., pulleys or driven rolls) and so forth. In an exemplary embodiment of the present technique in which two motors are used to motor a system, a method for motor braking may include motoring (i.e., not braking) one motor, for example motor 30, and regeneratively braking a second motor, such as motor 52. In so doing, energy gained from the regenerative loading of motor 52 is directed towards the DC bus. This regenerative braking regime can be alternately applied to avoid tripping of one or more motor drives that could otherwise occur by allowing the voltage of the DC bus to rise excessively.

Moreover, in an exemplary embodiment where motor drive systems 12 and 14 are used to propel a vehicle, slowing motor 52 while motoring motor 30 may cause the vehicle to deviate from a straight line as its path curves in the direction of braking. To mitigate such motion, sensors 56 and 58 provide feedback controller 38 so as to alternate braking between motors 30 and 52. Switching of braking may be determined by whether the motors and/or loads coupled thereto have reached certain speeds and/or whether the vehicle or load has reached directional thresholds, prompting controller 38 to, for example, switch motor 52 from regenerative braking to motoring and place motor 30 in regenerative braking.

In this manner, operational modes of motors 30 and 52 are switched, i.e., energy derived from regenerative loading of motor 30 is directed to the DC bus to drive the motor 52. Accordingly, sensors 34 and 36 acquire motor and load data of the motor 30 and load 32, respectively, so that controller 38 may determine times for switching between operational modes or braking regimes of the two motors. In this manner, the controller 38 may alternate switching between motoring and regenerative braking such that each motor experiences equal time-average braking, or at least so that tracking of the load remains within acceptable limits. Thus, in a vehicle application, for example, the vehicle motion can be maintained along a general linear path as wheels or tracks on both sides of the vehicle are driven and braked so as to maintain proper tracking of the vehicle. It should be understood that prior to initiating the above mentioned braking process of the motors 30 and 52, the controller 38 may disconnect powers supplies 18 and 40 from motors 30 and 52, respectively. Further, controller 38 controls the inverters 26 and 50 in a manner enabling current to flow, via the DC bus, between the motors 30 and 52, respectively, during the aforementioned braking process.

By alternating the motors between motoring and regenerative braking regimes, braking energy that otherwise would be dissipated, for example by resistive elements contained in the motor system, is dissipated at a maximum rate as electrical current in the motors is kept at a high level for a maximal amount of time throughout the braking process. Further, such a method enables regeneratively braking the motors 30 and 52 while maintaining their respective DC busses (which generally will have the same voltage due to the common connection) under voltage limits which otherwise would be exceeded, causing one or both drive systems to trip and, thus, hinder the motor braking process.

In another exemplary embodiment of the present technique, the motors 30 and 52 may undergo braking such that one motor may experience regenerative braking, while a second motor experiences DC injection braking. DC injection braking is a method whereby DC current is injected from the DC bus to the motor, causing the motor to produce a braking torque. As appreciated by those of ordinary skilled in the art, braking torque produced by DC injection braking may depend upon motor speed nonlinearly. Further, in general, regenerative braking may be more effective in providing braking torque than injection DC braking. However, again, this comparison will typically depend upon the speed of the inertial load.

Accordingly, a braking process may constitute alternating two motors between regenerative braking and DC injection braking in a manner similar to that described above. That is, controller 38 may alternate motors 30 and 52 between regenerative braking and DC injection braking regimes to the extent permitted by speed and/or directional limits of the motors and loads coupled thereto, and also to stay within the limits permitted by DC bus voltage levels (i.e., to avoid tripping). For example, when braking motor systems 12 and 14, motor 30 may be switched to regenerative braking such that regenerative loading produces voltage across the DC bus of the motor. Accordingly, this voltage can be provided, via the common DC bus, to the DC bus of motor 52 providing the desired energy to initiate DC injection braking of motor 52. In this manner, regenerative energy is provided by motor 30 for braking motor 52. As described above, motors 30 and 52 can each be alternated between regenerative braking and DC injection braking so that each motor provides an equal time-averaged braking torque, or to ensure proper tracking of the inertial load (i.e., in the event that braking is unequal). To the extent DC injection braking depends upon motor speed, the amount of time each motor remains in regenerative braking or DC injection braking regimes may vary, as would be determined by controller 38, such as based upon speed or tracking signals from the sensors.

As would be appreciated by those skilled in the art, controlling motor braking, as described above with respect to the motor drive systems 12 and 14, may be implemented in systems having multiple motor systems coupled via their DC busses. Accordingly, the present technique would enable alternating multiple motors between motoring and regenerative braking regimes or between regenerative braking and DC injection braking regimes. As will be described further below with regard to FIG. 7, a braking regime applied to a single motor is provided such that the single motor alternates between regenerative braking and DC injection braking. In such a braking regime of single motor, energy is alternately placed onto and removed from the DC bus during regenerative braking and DC injection braking, respectively.

Figure 2:
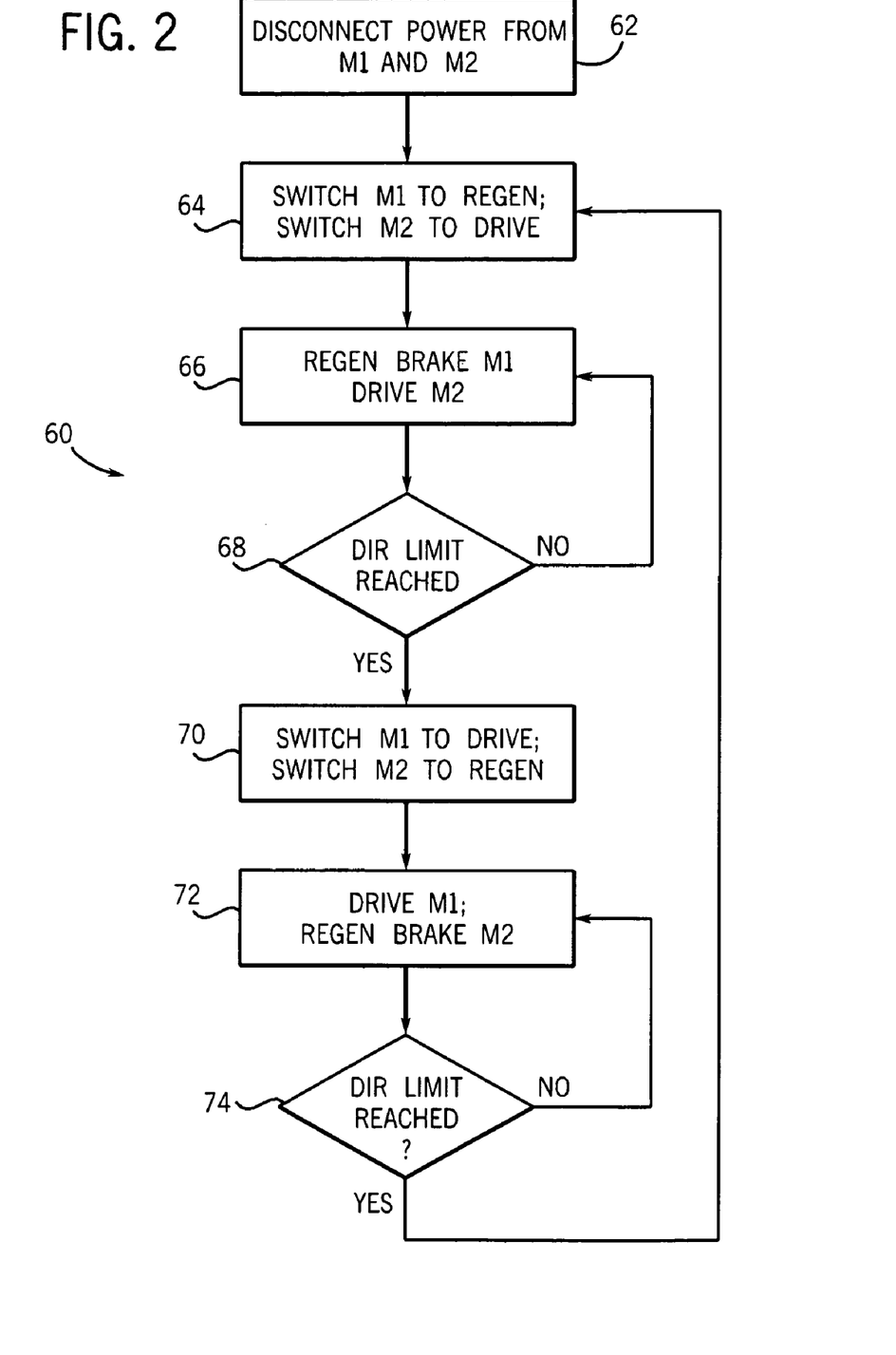
FIG. 2 is a flow chart of a method of controlling braking of two electric motors in accordance with an embodiment of the present technique.

FIG. 2 is a flow chart of an exemplary method 60 for controlling motor braking in accordance with exemplary embodiment of the present technique. The method 60 entails controlling motor braking of two motors, such as motors 30 and 52 (FIG. 1), coupled via their DC busses such that each of the motors alternates between motoring and regenerative braking throughout the braking process.

The process begins at block 62 whereby electrical power is disconnected from the motors so as to avoid adding energy to the DC busses of the motors from power sources, such as those mentioned above with regard to FIG. 1 couplable to the motor drive systems 12 and 14, before braking is initiated. Accordingly, this would be implemented by a control system, such as controller 38 (FIG. 1) disconnecting power supplies 18 and 40 from motors 30 and 56, respectively. Power may be later restored for motoring the motors. Next, motor braking is initiated as the method proceeds to block 64, whereby one motor, such as motor 30 (FIG. 1) is switched to regenerative braking, such that it provides power to the DC bus, and the second motor, such as motor 52, receives power from the inverter, and thereby from the bus. Thereafter, the method proceeds to block 66 whereby each of the two motors above operates in the state in which it was placed in the previous step. From block 66 the method proceeds to decision junction 68 to determine whether directional limits/thresholds have been reached. That is, due to its braking, motor 30 and/or load 32 may reach certain speed and/or directional limits necessitating controller 38 to switch the first motor, i.e., motor 30, to motoring and the second motor, i.e., motor 52, to regenerative braking. For example, as described above with respect to FIG. 1, this could be aided by sensors 34 and 36 providing motor and load feedback data of the motors 30 and load 52, respectively, to controller 38 to perform the above switching between motoring and braking regimes.

Thus, if directional limits are not reached, method 60 returns from decision junction 68 to block 66 until such limits are attained. Accordingly, once directional limits are reached, the method proceeds from decision junction 68 to block 70, where the first motor is switched to motoring mode and the second motor is switched to regenerative braking. In so doing, a control system, such as the controller 38 (FIG. 1), alternates the two motors between regenerative braking and motoring. Thereafter, the method proceeds to block 72 whereby each of the two motors operates in the state they were placed in the previous step. Next, the method proceeds to decision junction 74 to determine whether a directional limit has been reached by the motors and/or loads coupled thereto. If not, the method loops back to block 72 until such limits are reached. When this occurs, the method returns to block 64 and the two motors are switched such that the first motor is placed in a regenerative braking regime and the second motor is placed in a motoring mode.

It should be borne in mind that along all steps of the method 60 the motors and/or loads coupled thereto are checked to determine whether motion of any of these elements has ceased. In other words, if either of the two motors stops, the braking process terminates such that there would be no need to switch between braking and motoring modes. It should further be borne in mind that the motor braking method described above can be extended to include any number of motors connected via their DC busses.

Figure 3:
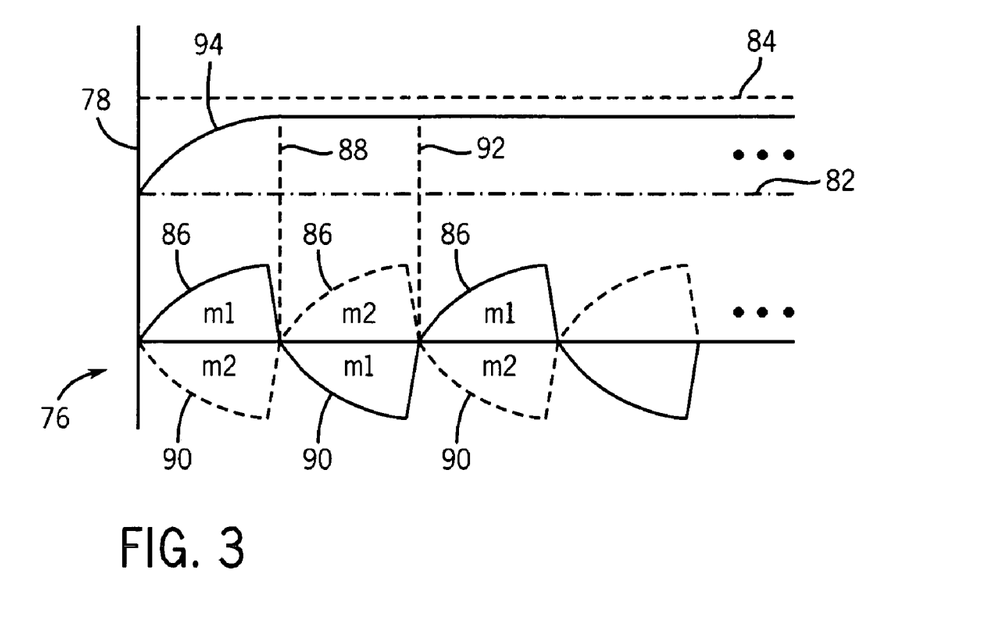
FIG. 3 is a graphical representation of a voltages across a DC bus in accordance with an embodiment of the present technique during the braking regime of FIG. 2.

FIG. 3 is a graphical representation 76 of DC bus voltages during the foregoing braking process. The graphical representation 76 includes traces of DC bus voltages versus time produced during a braking process, such as the one described above in FIG. 2, as two motors coupled via their DC bus alternate between regenerative braking regimes and motoring. Accordingly, graphical representation 76 includes a vertical axis 78, denoting DC bus voltage, and a horizontal axis 80, denoting time. Line 82 represents a DC bus voltage level existing before motor braking initiates (i.e., the nominal bus voltage) and line 84 represents a DC bus voltage limit, such that when reached one or both of the drives trips.

Trace 86 denotes a contribution to the DC bus voltage resulting while a first motor or a second motor, such as motor 30 or 52 (FIG. 1), is placed in a regenerative braking regime. As depicted by trace 86, DC bus voltage rises with time until the motor or load coupled thereto reach a speed and/or directional limits or until the DC bus voltage reaches a limit just below the tripping voltage 84. Vertical line 88 indicates such a point in time as the first motor is switched from regenerative braking to motoring and the second motor, such as motor 52 (FIG. 1), is switched from motoring to regenerative braking. Further, trace 90 represents a contribution to the DC bus voltage while the first motor or the second motor is in a motoring mode. Accordingly, trace 90 depicts a drop of DC bus voltage until the first or second motor and/or loads coupled thereto reach speed and/or directional limits, requiring again alternating the two motors between regenerative braking and motoring. Vertical line 92 indicates a point in time where such switching of regimes would be performed. FIG. 3 further illustrates trace 94 depicting a net contribution to the DC bus voltage resulting from regenerative braking one motor and motoring a second motor. As shown by trace 94, the DC bus voltage is kept below the tripping voltage level 84, as-energy gained by regenerative loading of one motor is used for motoring a second motor.

Figure 4:
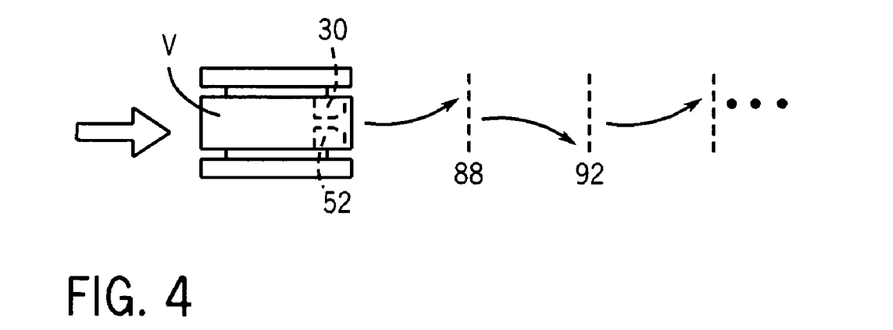
FIG. 4 illustrates possible motion of a vehicle during braking in accordance with an embodiment of the present technique.

FIG. 4 illustrates motion of a vehicle (V) that could result from motor braking in accordance with the foregoing technique. In the illustrated embodiment, vehicle (V) includes two motors 30 and 52 disposed at each side of the vehicle as shown by the figure. The motors 30 and 52 may be coupled to corresponding wheels or tracks which propel the vehicle. In accordance with the present technique, as the vehicle undergoes braking, motors 30 and 52 may alternate between motoring and regenerative braking in a manner described above and shown in FIGS. 1-3. For example, as motor 30 undergoes regenerative braking it slows one side of the vehicle, causing the vehicle to deviate until a directional limit is reached, as indicted by transition line 88. As described with respect to FIG. 3, transition line 88 also marks the point in time at which motor 30 transitions to motoring and motor 52 transitions to regenerative braking. Similarly, as motor 52 experiences regenerative braking, the other side of the vehicle begins to deviate in the opposite direction until direction limits are reached, as indicated by vertical line 92. At this point motors 30 and 52 are, once more, alternated between regenerative braking and motoring. During the braking process, the motion of the vehicle may slightly deviate from side to side to the extent directional thresholds maintain vehicle motion along a generally linear path before the vehicle reaches to a halt.

Figure 5:
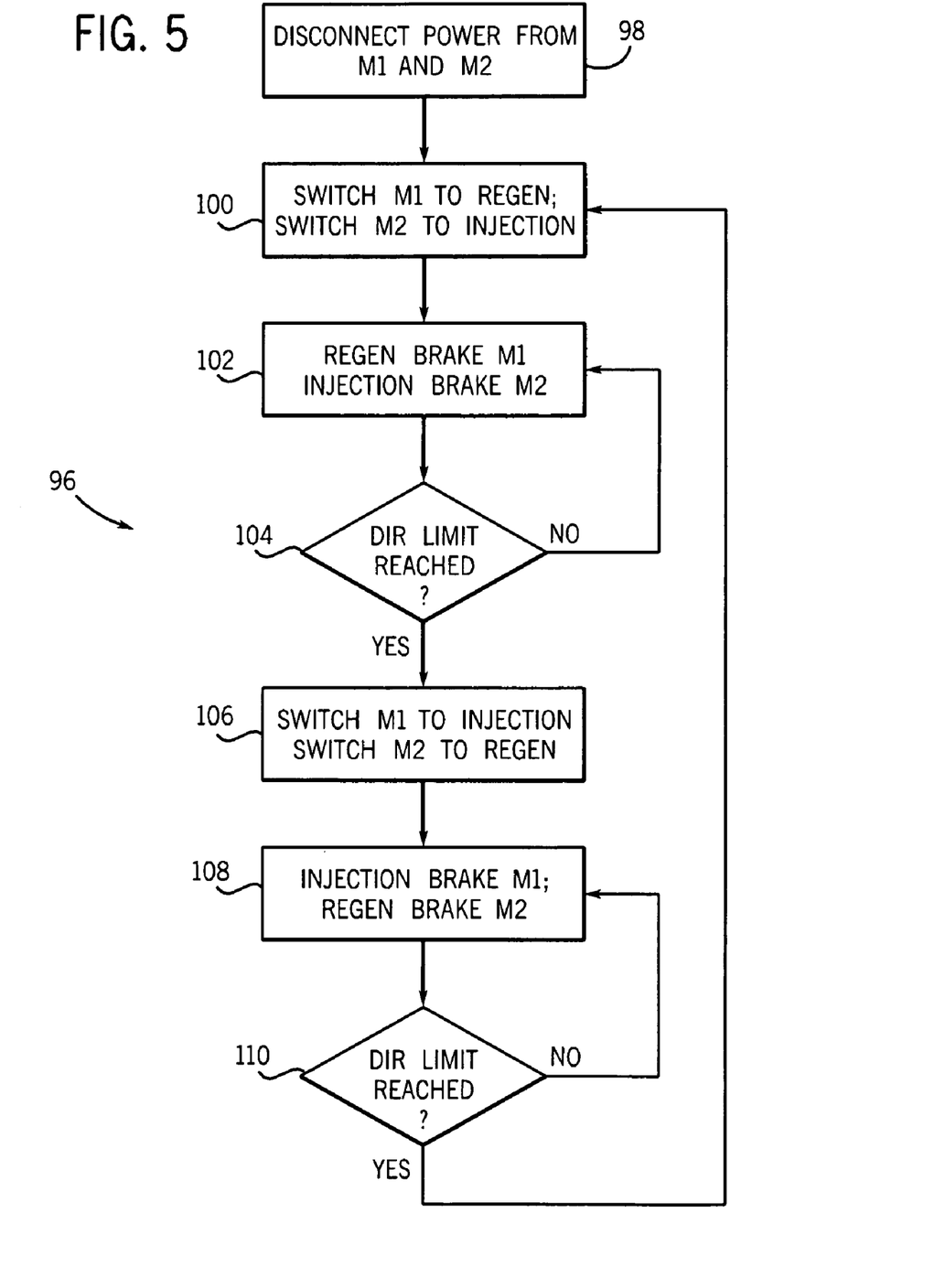
FIG. 5 is a flowchart of an alternative method of controlling braking of two motors in accordance with an embodiment of the present technique.

FIG. 5 is a flow chart depicting an alternative method 96 for controlling motor braking, in accordance with exemplary embodiment of the present technique. The method 96 entails controlling motor braking of two motors, such as motors 30 and 52 (FIG. 1) coupled by their DC busses, such that each of the motors alternates between DC injection braking and regenerative braking throughout the braking process.

Hence, the process begins at block 98 whereby power is disconnected from both motors so as to avoid adding energy to the DC busses of the motors from power sources, such as those mentioned above with regard to FIG. 1 couplable to the motor drive systems 12 and 14, before braking is initiated. Accordingly, this would be implemented by a control system, such as the controller 38 (FIG. 1), disconnecting power supplies 18 and 40 from motors 30 and 56, respectively. Power may be subsequently restored as required for providing motoring power to the motors. Next, motor braking initiates as the method proceeds to block 100 where one motor, such as motor 30 (FIG. 1) is switched to regenerative braking and the second motor, such as motor 52 (FIG. 1), is switched to DC injection braking. Thereafter, the method proceeds to block 102 whereby each of the two motors operates in the state in which it was placed in the previous step. From block 100, the method proceeds to decision junction 104 to determine whether a directional limit has been reached by either motor. That is, due to braking, motor speed and/or directional changes of the two motors and loads coupled thereto may reach certain thresholds, necessitating alternating the motors between regenerative and DC injection braking. As will be appreciated by those skilled in the art, generally regenerative braking may produce braking torque greater than that provided DC injection. Therefore, in general, the motor undergoing regenerative braking may cause the load to reach a directional limit due to unbalanced braking with the motor undergoing DC injection braking. However, as mentioned above, this may not be so in some cases where and while motor speed is optimal for DC injection braking.

If directional limits are not reached by either of the motors, method 96 returns from decision junction 104 to block 102 until one of the motors or the load reaches such a limit. Accordingly, once a speed and/or directional limit is attained by either motor or by the load, the method proceeds from decision junction 104 to block 106 whereby the first motor is switched from regenerative braking to DC injection braking and the second motor is switched from DC injection braking to regenerative braking. In so doing, a control system, such as the controller 38 of FIG. 1, alternates the two motors between regenerative and DC injection braking. Thereafter, the method proceeds to block 108, whereby each of the two motors operates in the state in which they were placed in the previous step. Next, the method proceeds to decision junction 110 to determine whether speed and/or directional limits are reached by either of the motors and/or loads coupled thereto. If not, the method loops back to block 108 until such limits are reached by either of the motors. When directional limits are reached, the method returns to block 100 and the two motors are alternated, such that the first motor is switched to regenerative braking and the second motor is switched to DC injection braking.

It should be borne in mind that along all steps of method 96 the motors and/or loads coupled thereto are checked to determine if motion of any of these elements has ceased. In other words, if either of the two motors stops, the braking process terminates to the extent that there would be no need to switch the motors between regenerative braking and DC injection braking. It should further be borne in mind that the motor braking method described above can be extended to systems having multiple motors connected by their DC busses. Finally, it should be borne in mind that the DC bus voltage is monitored during the braking process to ensure that the trip limit of either drive is not reached. If the limit is approached, regenerative braking may be temporarily reduced in magnitude or ceased to permit the energy in the bus to be dissipated.

Figure 6:
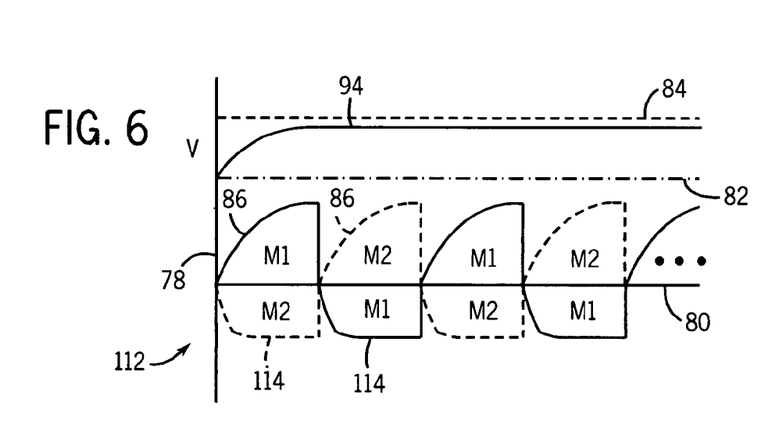
FIG. 6 is a graphical representation of voltages across a DC bus in accordance with an exemplary embodiment of the present technique during the braking regime of FIG. 5.

FIG. 6 is a graphical representation 112 of DC bus voltages during the regenerative/injection braking scheme outlined above. The graphical representation 112 includes DC bus voltages produced during the braking process with respect to a vertical axis 78, denoting DC bus voltage, and horizontal axis 80 denoting time. Line 82 represents the nominal DC bus voltage before motor braking initiates and line 84 represents an upper DC bus voltage limit at which one or both of the drives would trip.

Trace 86 denotes a contribution to the DC bus voltage resulting when a first motor or a second motor, such as motor 30 or 52 (FIG. 1), is placed in regenerative braking. As depicted by trace 86, DC bus voltage rises with time until the motor or loads coupled thereto reach speed and/or directional limits or just before the DC bus reaches the tripping voltage 84, prompting an increased magnitude of DC injection braking of the other motor.

FIG. 6 further illustrates trace 114 denoting voltage reductions from the DC bus voltages due to extraction of energy from the bus by the second and first motors, respectively, during DC injection braking such that when one motor is placed in regenerative braking the other motor is placed in DC injection braking. As indicated by traces 86 and 114, DC bus voltages generated by DC injection braking are comparatively lower to DC bus voltages generated by regenerative braking. Such voltages are consistent with braking torques provided by DC injection braking and regenerative braking. FIG. 6 further illustrates trace 94 depicting a net contribution to the DC bus voltage resulting from placing one motor in regenerative braking and a second motor in DC injection braking. As depicted, the net voltage is kept below voltage limit 84 so as to avoid tripping the DC bus of either motor.

Figure 7:
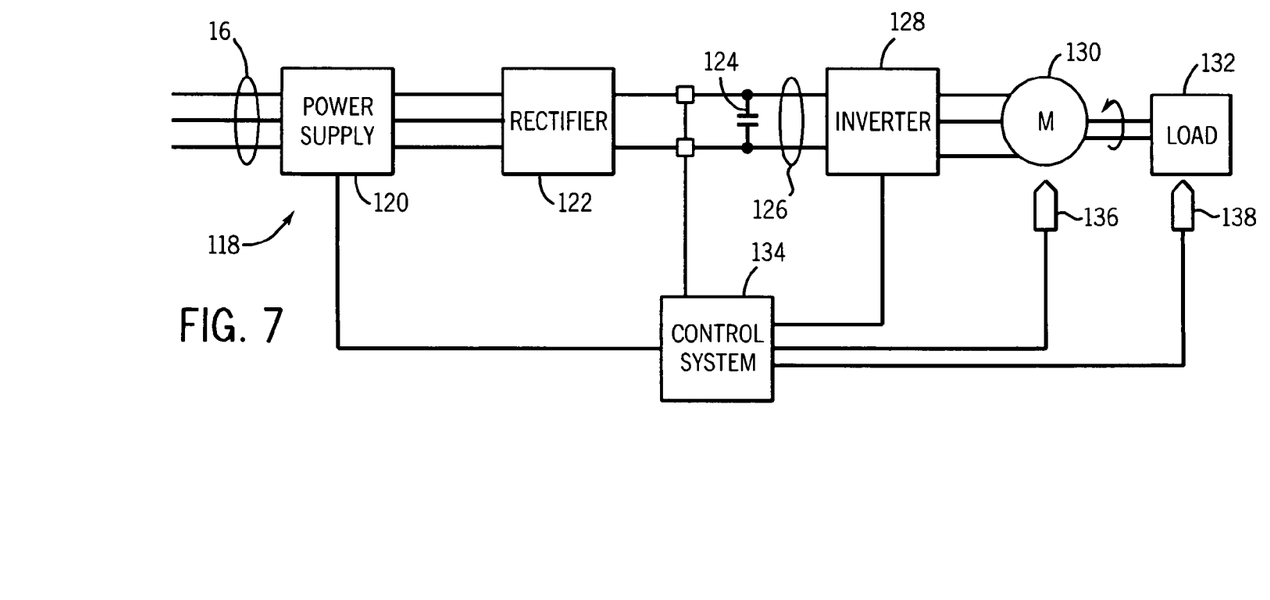
FIG. 7 is a diagrammatical view of a single motor system for motoring and braking an inertial load in accordance with an embodiment of the present technique.

FIG. 7 illustrates a single motor drive system 118 in accordance with an alternative embodiment of the present technique. Motor drive system 118 may be similar to each of the motor drive systems 12 and/or 14 depicted in FIG. 1. Accordingly, the motor drive system is provided with a three-phase alternating current AC input power 16, typically from the power grid, via a three-phase power supply 120. As with the motor drive systems 12 and 14, the motor drive system 118 may be provided with a single phase power or with a power input originating from an electrical source, such as a DC generator, a battery or a fuel cell. In alternative embodiments where some of the aforementioned elements are implemented, rectifier 122 may be omitted from the circuit shown in FIG. 7. The power supply 120 routes the AC supply to a rectifier 122 which converts the AC input into DC power for application to the DC bus 126. A capacitor 124 and DC bus voltage sensors, such as the voltage sensors 28, 50 (FIG. 1), are placed across the DC bus to smooth DC voltage, as well as to sense DC bus voltages, respectively. The rectifier 122 provides, via DC bus 126, DC input power to an inverter 128 providing output power to motor 130 coupled to an inertial load 132. As will be appreciated by those skilled in the art, the inverter 128 is typically controlled by a control circuit that triggers solid state switches in the inverter 128 to generate an AC output waveform of desired frequency for motoring the motor.

The motor drive system 118 may further include sensors 136 and 138 coupled to the motor 130 and load 132, respectively, and to a controller 134. Sensor 136 is configured to monitor motor parameters, such as motor speed, shaft angle and so forth. Sensor 138 is configured to monitor parameters, such as directional shifts and accelerations of load 132. Signals representative of these parameters feed into controller 134 which is also coupled to power supply 120, the DC bus voltage sensors and inverter 128. In some embodiments, control system 134 can be powered by voltage supplied thereto by DC bus 126. In the illustrated embodiment, coupling control 34 to power supply 120 enables controlling the power supply for placing the motor in a braking regime.

In accordance with this embodiment of the present technique, a motor braking method alternately utilizing regenerative braking and DC injection braking may be implemented by the motor system 118. For example, regenerative braking may be applied to motor 130 such that energy gained through regenerative loading may be subsequently used for DC injection braking. That is, energy gained by the DC bus of the motor as the motor undergoes regenerative braking is subsequently used for routing DC current back to the motor so as to avoid DC bus tripping resulting from voltage buildup across DC bus 126. In this manner, energy provided by a braking load 132, which otherwise would be thermally dissipated, may be used to maintain DC bus voltage 124 under a trip voltage while further slowing motor 130. When sufficient energy is drawn from DC bus 126 during DC injection braking, voltage levels across the DC bus may be depleted, allowing switching motor 130 back to a regenerative braking regime. During the switching process, DC bus voltage sensors are employed to sense DC bus voltage, prompting controller 134 to switch between DC injection braking and regenerative braking, respectively. It should be noted that some of the energy resulting from regenerative braking, and used during injection braking will be stored in and drawn from capacitor 124.

Figure 8:
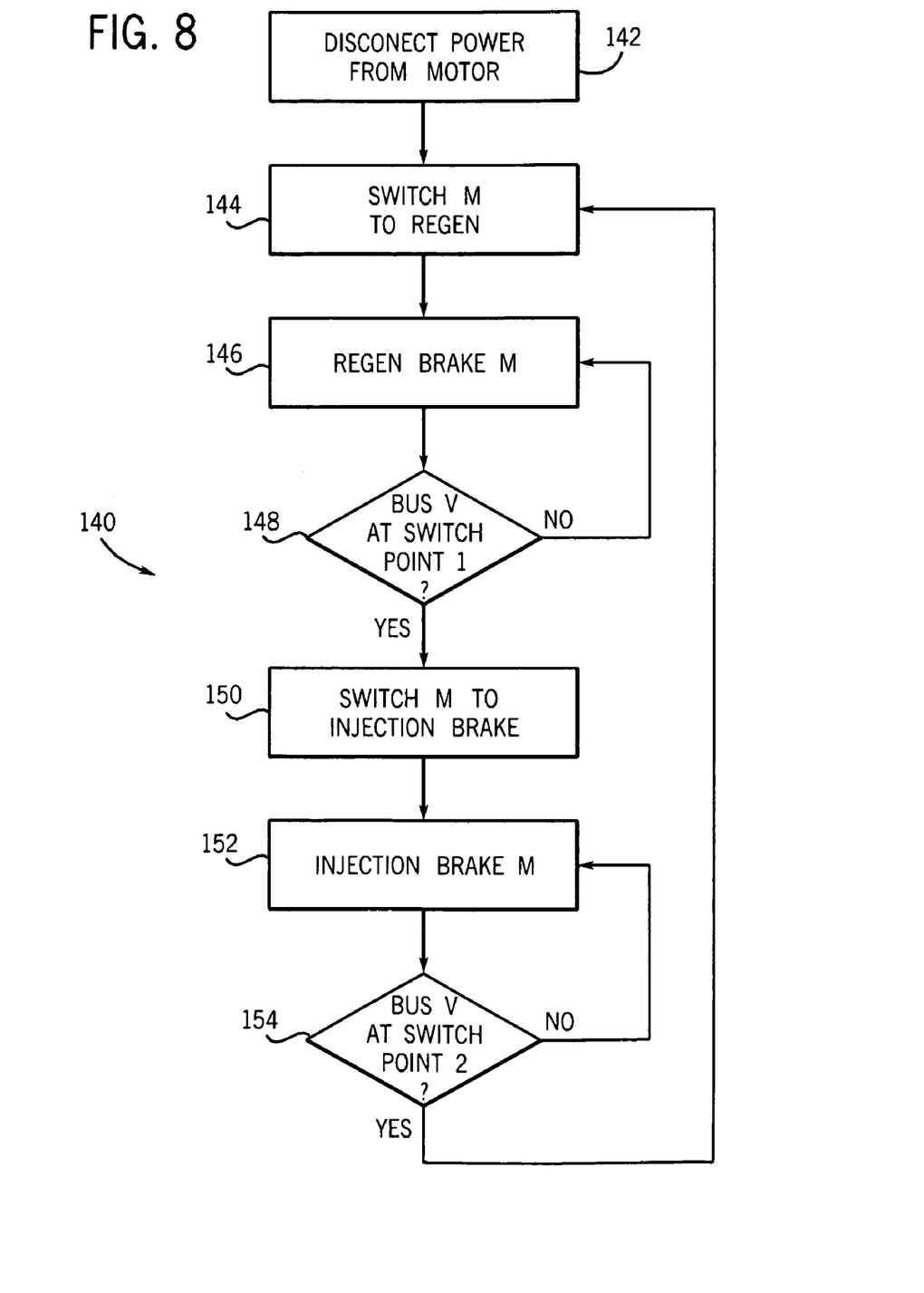
FIG. 8 is a flow chart of a method of controlling braking of a single motor in a system of the type shown in FIG. 7 in accordance with an embodiment of the present technique.

FIG. 8 is a flow chart of a method 140 for controlling motor braking, in accordance with this embodiment of the present technique. The method 140 entails controlling motor braking, such as motor 130 (FIG. 6), such that the motor alternates between regenerative braking and DC injection braking.

The flow chart begins at block 142 whereby power is disconnected from the motor so as to avoid adding energy to the DC bus of the motors from power sources, such as those mentioned above with regard to motor drive system 118. Power may be subsequently reapplied for motoring the motor. Accordingly, this would be implemented by a control system, such as the controller 134 of FIG. 6, disconnecting power supply 134 from motors 130. Next, motor braking initiates as the method proceeds to block 144, where the motor is switched to regenerative braking. Thereafter, the method proceeds to block 146 ensuring motor 130 operates in the state in which it was placed in the previous step. While in this state, DC bus voltage of DC bus 124 begins to rise due to regenerative loading produced by load 132 (FIG. 6). Accordingly, from block 146, the method proceeds to decision junction 148 to determine whether the DC bus voltage is approaching a limit that could cause the drive to trip. That is, due to braking, the DC bus voltage may rise to a level necessitating switching the motor from regenerative braking to DC injection braking. For example, as described above with respect to FIG. 6, DC bus voltage sensors may provide DC bus voltage data to controller 134 to determine whether to switch the control regime for the inverter to DC injection braking.

If the DC bus voltage remains below the trip voltage to the extent that regenerative braking of the motor continues, method 140 returns from decision junction 148 to block 146 until the trip voltage limit is approached. Once the DC bus voltage nears the DC bus trip voltage limit, the method proceeds from decision junction 148 to block 150, in which the motor is switched to DC injection braking. In so doing, control system 134 (FIG. 6) alternates the motor between regenerative braking and DC injection braking regimes. Thereafter, the method proceeds to block 152 where the motor operates in the state in which it was previously placed. Next, the method proceeds to decision junction 154 to determine whether DC bus voltage has fallen sufficiently to permit switching back to regenerative braking. In other words, this juncture determines whether DC bus energy has dropped to a transition level such that it is appropriate to resume regenerative braking and allow the DC bus voltage to rise again. If such a level is not reached, the method loops back to block 152 until the DC bus voltage reaches either the lower transition level or a lower limit. Once the DC bus voltage reaches the lower transition level or a lower limit, the method returns to block 144 and the motor is switched from DC injection braking to regenerative braking by appropriate control of the inverter.

It should be born in mind that along all steps of method 140, motor speed or other signals are sampled to determine whether the motor has completely come to halt. In other words, if the motor stops during the aforementioned braking procedure, method 140 terminates.

Figure 9:
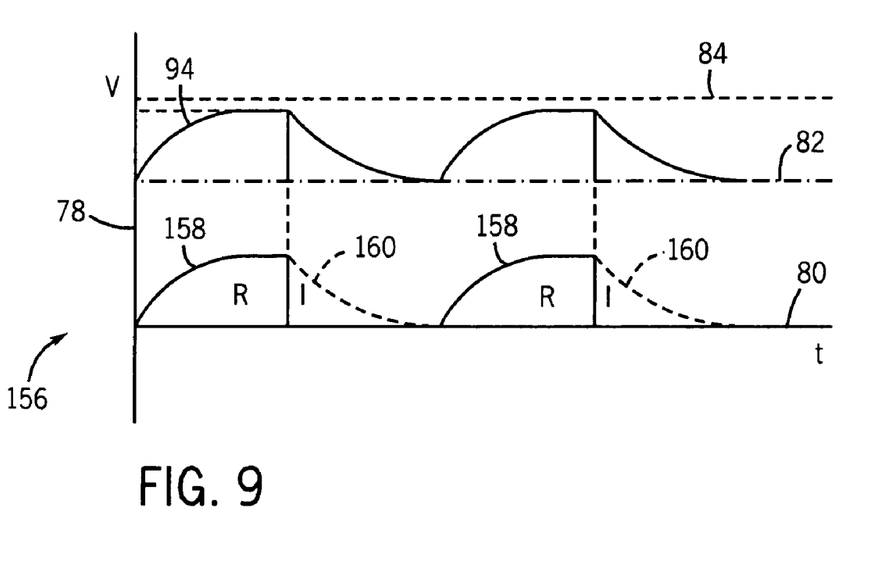
FIG. 9 is a graphical representation of voltages across a DC bus in accordance with an exemplary embodiment of the present technique during braking of a single motor system by the process summarized in FIG. 8.

FIG. 9 is a graphical representation 156 of DC bus voltages in accordance with this embodiment of the present technique. The graphical representation 156 include traces of DC bus voltages versus time, as represented by a vertical axis 78, denoting DC bus voltage and a horizontal axis 80 denoting time. Line 82 represents the nominal DC bus voltage at a level existing before motor braking initiates and line 84 represents a DC bus voltage that could result in tripping of the drive.

Trace 158 denotes a contribution to DC bus voltage resulting when the motor, such as motor 130 (FIG. 1), is placed in regenerative braking. The DC bus voltage rises with time until the net DC bus voltage, denoted by trace 94, almost reaches tripping voltage level 84. Prior to reaching such a level, the motor is switched to DC injection braking. The motor then draws voltage down, as indicated by trace 160 representing the DC bus voltage draw down as the motor undergoes DC injection braking. As further depicted by trace 94, while the motor is undergoing DC injection braking net DC bus voltage drops due to energy injected to the motor from the DC bus. Such a drop persists until voltage drops to a level either allowing or requiring switching the motor back to the regenerative braking regime. In this manner, the motor is alternated between regenerative braking and DC injection braking.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling electric motors coupled to an inertial load, the method comprising:
controlling a first motor via a first inverter drive in an injection braking regime; and
controlling a second motor via a second inverter drive in a regenerative braking regime;
wherein the first and second motor drives are coupled to a common DC bus, and the injection braking regime and the regenerative braking regimes are regulated based upon energy drawn from the DC bus by injection braking and energy fed to the DC bus by regenerative braking, wherein the energy delivered to the DC bus by the regenerative braking regime is simultaneously dissipated by the injection braking regime.

2. The method of claim 1, further comprising sensing voltage on the DC bus and regulating the injection braking regime and the regenerative braking regime based upon the DC bus voltage.

3. The method of claim 2, wherein the injection braking regime and the regenerative braking regime are regulated to maintain a substantially constant DC bus voltage.

4. The method of claim 2, wherein the injection braking regime and the regenerative braking regime are regulated to maintain the DC bus voltage below a predetermined voltage.

5. The method of claim 4, wherein the predetermined voltage is a voltage above which one or both of the inverter drives would trip.

6. The method of claim 1, wherein the regenerative braking regime includes intermittently regeneratively braking the second motor.

7. The method of claim 1, wherein the first and second motors are disposed on opposite sides of a vehicle, and either the injection braking regime, or the regenerative braking regime, or both are regulated to control tracking of the vehicle.

8. The method of claim 1, comprising alternatively controlling the first and second motors in injection braking and regenerative braking regimes.

9. A method for controlling an electric motor coupled to an inertial load, the method comprising:
sensing voltage of a DC bus coupled to an inverter drive that controls the motor; and
intermittently applying a regenerative braking regime via the inverter drive to brake the motor while maintaining the DC bus voltage below a predetermined voltage; and
applying an injection braking regime during periods when the regenerative braking regime is not applied to the motor in a manner such that the energy delivered to the DC bus by the regenerative braking regime is simultaneously subsequently dissipated by the injection braking regime.

10. The method of claim 9, wherein the predetermined voltage is a voltage above which the inverter drive would trip.

11. A system braking an inertial load comprising:
first and second electric motors;
first and second inverter drives coupled to the first and second motors, respectively; and
a common DC bus providing electrical power to both inverter drives;
wherein the first motor drive is configured to apply an injection braking regime to the first electric motor and the second motor drive is configured to apply a regenerative braking regime to the second electric motor when the first motor drive is applying the injection braking regime to the first electric motor; and
wherein the energy delivered to the DC bus by the regenerative braking regime is simultaneously dissipated by the injection braking regime.

12. The system of claim 11, comprising a sensor for sensing the voltage of the DC bus, and wherein the regenerative braking regime is regulated based upon the DC bus voltage.

13. The system of claim 11, wherein the first and second inverter drives are configured to alternatively provide injection and regenerative braking regimes to their respective electric motors.

14. A system for braking an inertial load, the system comprising:
first and second electric motors;
first and second inverter drives coupled to the first and second motors, respectively; and
a common DC bus providing electrical power to both inverter drives;
wherein the first and second inverter drives are configured to apply a regenerative braking regime to the first motor and a motoring regime to the second motor, respectively; and
wherein the energy delivered to the DC bus by the regenerative braking regime is simultaneously dissipated by the injection braking regime.

15. The system of claim 14, wherein control of the first and second motors is alternated between the regenerative braking regime and the motoring regime, whereby energy resulting from regenerative braking of one motor is dissipated by the other motor operated in the motoring regime.

16. The system of claim 14, wherein the first and second motors are disposed on opposite sides of a vehicle and the regenerative braking regime is applied to the first and second motors to control tracking of the vehicle.

17. The system of claim 14, wherein the first and second inverter drives are configured to regulate application of the regenerative braking regime to maintain the voltage on the DC bus below a predetermined voltage.

18. A system for controlling an electric motor coupled to an inertial load, the system comprising:
an inverter drive coupled to the motor for controlling operation of the motor, a DC bus coupled to the inverter drive to provide power to the inverter drive; and a sensor for sensing voltage of a DC bus;

wherein the inverter drive is configured to intermittently apply a regenerative braking regime to brake the motor while maintaining the DC bus voltage below a predetermined voltage; and wherein the inverter drive is configured to apply an injection braking regime during periods when the regenerative braking regime is not applied to the motor.

19. The system of claim 18, wherein the predetermined voltage is a voltage above which the inverter drive would trip.

* * * * *